United States Patent [19]

Mueller

[11] Patent Number: 4,526,257

[45] Date of Patent: Jul. 2, 1985

[54] VARIABLE SPEED ACCESSORY DRIVE

[75] Inventor: Robert S. Mueller, Birmingham, Mich.

[73] Assignee: Eaton Corporation, Cleveland, Ohio

[21] Appl. No.: 561,751

[22] Filed: Dec. 15, 1983

[51] Int. Cl.³ .............................................. F01P 7/02
[52] U.S. Cl. ................................ 192/48.2; 192/48.3; 192/57; 192/84 C; 192/0.098
[58] Field of Search ............... 192/0.077, 0.098, 48.1, 192/48.2, 48.3, 48.9, 57, 58 B, 84 C

[56] References Cited

U.S. PATENT DOCUMENTS

| | | | |
|---|---|---|---|
| 2,895,575 | 7/1959 | Lamont | 192/57 |
| 3,028,737 | 4/1962 | Rudisch | 192/84 C X |
| 3,059,745 | 10/1962 | Tauschek | 192/58 |
| 3,429,192 | 2/1969 | Allen | 74/217 |
| 3,444,748 | 5/1969 | Sutaruk | 74/217 |
| 3,757,914 | 9/1973 | Elmer | 192/48.3 |
| 3,924,585 | 12/1975 | Woods | 123/41.12 |
| 4,224,841 | 9/1980 | Crooks | 74/801 |
| 4,227,861 | 10/1980 | La Flame | 192/48.3 X |
| 4,302,156 | 11/1981 | La Flame | 192/58 B X |
| 4,320,723 | 3/1982 | Wendling et al. | 192/58 B X |
| 4,482,038 | 11/1984 | Mason | 192/48.2 |

*Primary Examiner*—A. Michael Chambers
*Assistant Examiner*—John C. Fox

*Attorney, Agent, or Firm*—C. H. Grace; P. S. Rulou

[57] ABSTRACT

A drive mechanism (26) momentarily reduces the speed of engine-driven accessories in response to vehicle acceleration or increased power demands to improve fuel economy and to provide additional horsepower for the vehicle. The drive mechanism includes an electromagnetic clutch (48) operative, when engaged, to drive the accessories at constant speeds relative to speeds of an engine (10) and a viscous coupling (60) operative, when first engaged, in response to disengagement of the clutch, to first drive the accessories at a minimum speed and then to increase the accessory speeds to minimize shift shocks when the clutch is reengaged. The coupling includes a housing (58) defining an annular compartment (108) containing an annular clutch member (92) and a viscous liquid. A working chamber (113) within the compartment, defined by confronting surfaces of the housing and clutch member, transmits torque from the housing to the clutch member via viscous shear in response to relative rotation therebetween. An annular reservoir (114) circumscribing the working chamber receives liquid from the working chamber and minimizes the amount of liquid in the chamber when clutch (48) is engaged. A pump (116) returns the liquid to the working chamber when clutch (48) is disengaged.

10 Claims, 5 Drawing Figures

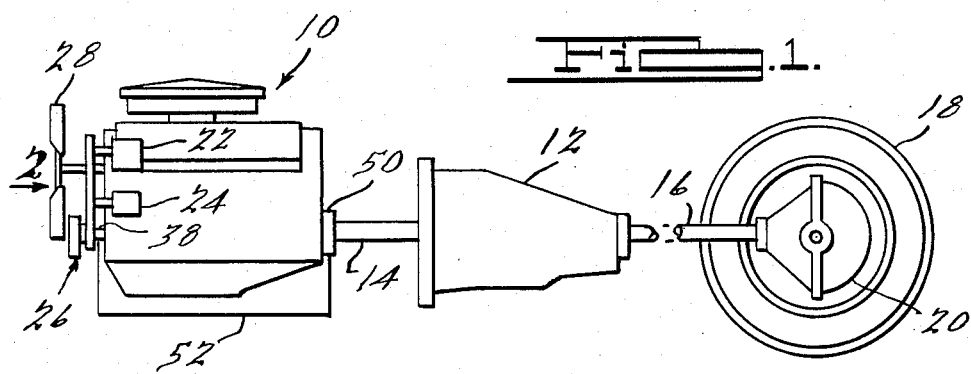
FIG. 1.
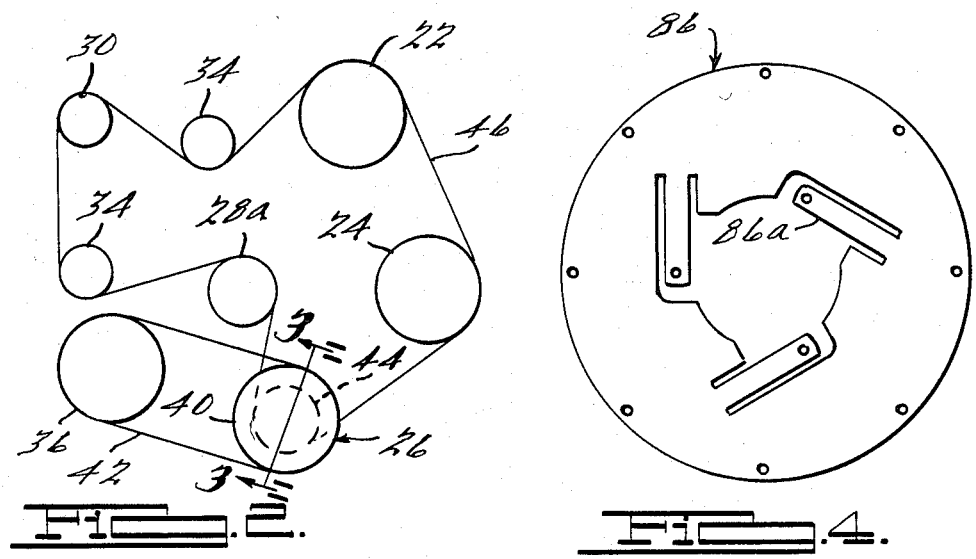
FIG. 2.
FIG. 4.
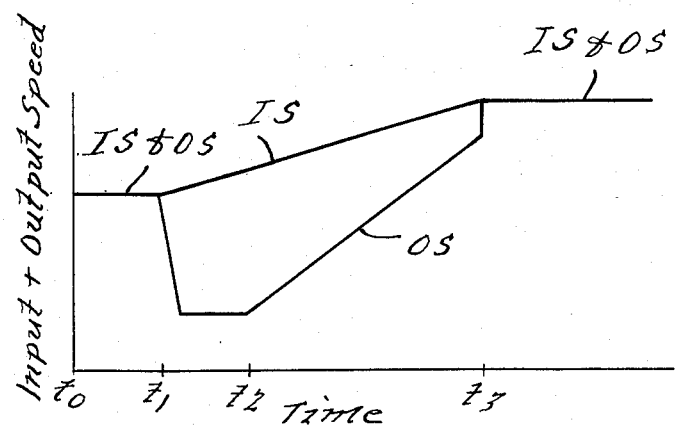
FIG. 3.

VARIABLE SPEED ACCESSORY DRIVE

BACKGROUND OF THE INVENTION

This invention relates to a mechanism for changing the drive ratio between a drive mechanism's input and output drives. More specifically, the invention relates to motor vehicles and such a mechanism for reducing the speed of engine drive accessories while the engine is accelerating the vehicle.

Vehicles having drive mechanisms for reducing the speed of a plurality of engine-driven accessories, in response to predetermined engine speed thresholds, are well-known. Most of these mechanisms were proposed during large engine eras, were mainly intended to reduce or optimize accessory size and to improve fuel economy during relatively steady-state operation of the vehicle. Consequently, the prior art mechanisms are of little value during urban cycle driving, where engine speeds are relatively low and where about 50% of the driving time is spent accelerating the vehicle. Accordingly, the prior art mechanisms do little to improve urban cycle fuel economy and/or to increase horsepower available for accelerating the vehicle.

Further, many of the prior art mechanisms have characteristics which make them unacceptable. For example, one class of such mechanisms are downsized versions of large, complex ratio change transmissions which, in many cases, are too bulky for the limited installation space available, are unacceptably expensive, and/or unreliable. Another class of such mechanisms, which are basically two clutches disposed in parallel between the engine and accessories, are not adaptable to provide substantial fuel economy improvement during urban cycle driving and/or to increase horsepower available for accelerating a vehicle.

One example of such a two-clutch mechanism is disclosed in U.S. Pat. No. 3,444,748. The mechanism is per se compact in that it requires only enough space for two output pulleys or powerpaths between the drive mechanism and the accessories. One of the pulleys or powerpaths drives the accessories via a viscous coupling at relatively high rotational speeds relative to the engine when engine speeds are low. The other pulley or powerpath drives the accessories via an overrunning clutch at reduced speeds relative to the engine when engine speeds are high. This arrangement, of course, requires two belt pulleys for each accessory and at least two drive belts, or an intermediate three belt pulley which is connected to the drive mechanism via two belts and with the accessories via a third belt. Hence, the added pulleys and drive belt add to the overall cost and space of the total accessory drive package. Further, the mechanism is not readily controllable to optimize or improve urban cycle fuel economy and/or to increase available horsepower for vehicle accelerations, since the mechanism is designed and intended to be responsive only to engine speed. Drive transition from the high-speed pulley to the low or reduced-speed pulley is effected by a pump in the viscous coupling in response to engine speeds. As the engine speed approaches a predetermined threshold speed, the pump becomes active and reduces the amount of viscous fluid in the coupling available for transmitting torque to the high-speed pulley, thereby increasing slip in the coupling due to accessory drive resistance. The slip reduces accessory speed relative to engine speed and reduces the output speed of the overrunning clutch until the clutch locks up due to its engine-driven input speed attempting to overrun the output speed.

Another example of a two-clutch mechanism is the double electromagnetic clutch arrangement disclosed in U.S. Pat. No. 3,429,192. This mechanism is intended as a two-speed drive for a single accessory, such as an air-conditioning compressor. If the mechanism were employed as a drive for a plurality of accessories, it would be somewhat analogous to the mechanism of U.S. Pat. No. 3,444,748 in that it would include two output drive pulleys of different size and two drive belts. Hence, the added pulleys and drive belt would add to the overall cost and space to the total accessory drive package. The electromagnetic clutches of this mechanism appear to be readily controlled to provide improved urban cycle fuel economy and/or to increase horsepower available for accelerating a vehicle. However, shifts from one clutch to the other would have to be performed while substantial speed differences exist between the clutches. Hence, the shifts would impose substantial shock loads on the accessories, the drive belt, the clutch, and the vehicle.

SUMMARY OF THE INVENTION

An object of this invention is to reduce shift shocks when a drive mechanism is shifted from one drive ratio mode to another.

A more specific object of this invention is to provide such a drive mechanism, operative when shifted from a first ratio mode to a second ratio mode, to reduce the mechanism's output speed relative to its input speed and then to increase the output speed relative to the input speed prior to shifting back to the first ratio mode.

The drive mechanism of the present invention is adapted for use as an engine accessory drive. The mechanism includes input and output drives mounted for relative rotation about a common axis; a clutch assembly including first and second portions mounted for relative rotation about the axis and operative when engaged to prevent relative rotation between the drives; and a fluid coupling including a rotatable housing member defining an annular compartment concentric to the axis and containing a fluid, and an annular clutch member disposed in the compartment for rotation about the axis relative to the housing. The members have annular confronting portions defining a working chamber for transmitting torque between the members in response to relative rotation of the members and in proportion to the amount of fluid in the working chamber.

According to a feature of the invention, the drive mechanism is improved to include: a first attachment connecting the coupling housing to the input drive to prevent relative rotation therebetween; a second attachment connecting the housing to the first clutch portion to prevent relative rotation between the housing and output drive when the clutch is engaged; a reservoir receiving fluid from the working chamber and effective when the clutch is engaged to reduce the amount of fluid in the working chamber; and a pump increasing the amount of fluid in the working chamber when the clutch is disengaged, whereby disengagement of the clutch assembly effects a rapidly reduced rotational speed of the output drive relative to the input drive followed by an increase in the rotational speed of the output drive relative to the input drive for minimizing the relative rotational speeds prior to reengagement of the clutch assembly.

BRIEF DESCRIPTION OF THE DRAWINGS

The drive mechanism of the present invention is shown in the accompanying drawing in which:

FIG. 1 is a schematic view of a portion of a vehicle drivetrain with the engine of the drivetrain having accessories driven by the drive mechanism of the present invention;

FIG. 2 is a schematic view of the engine accessories looking in the direction of arrow 2 in FIG. 1;

FIG. 4 is a reduced sized view of a spring assembly in FIG. 3; and

FIG. 5 is a schematic graph showing the relative rotational speeds of the drive mechanism's input and output drives during vehicle steady state and acceleration modes of operation.

DETAILED DESCRIPTION OF THE DRAWINGS

Figure 3:
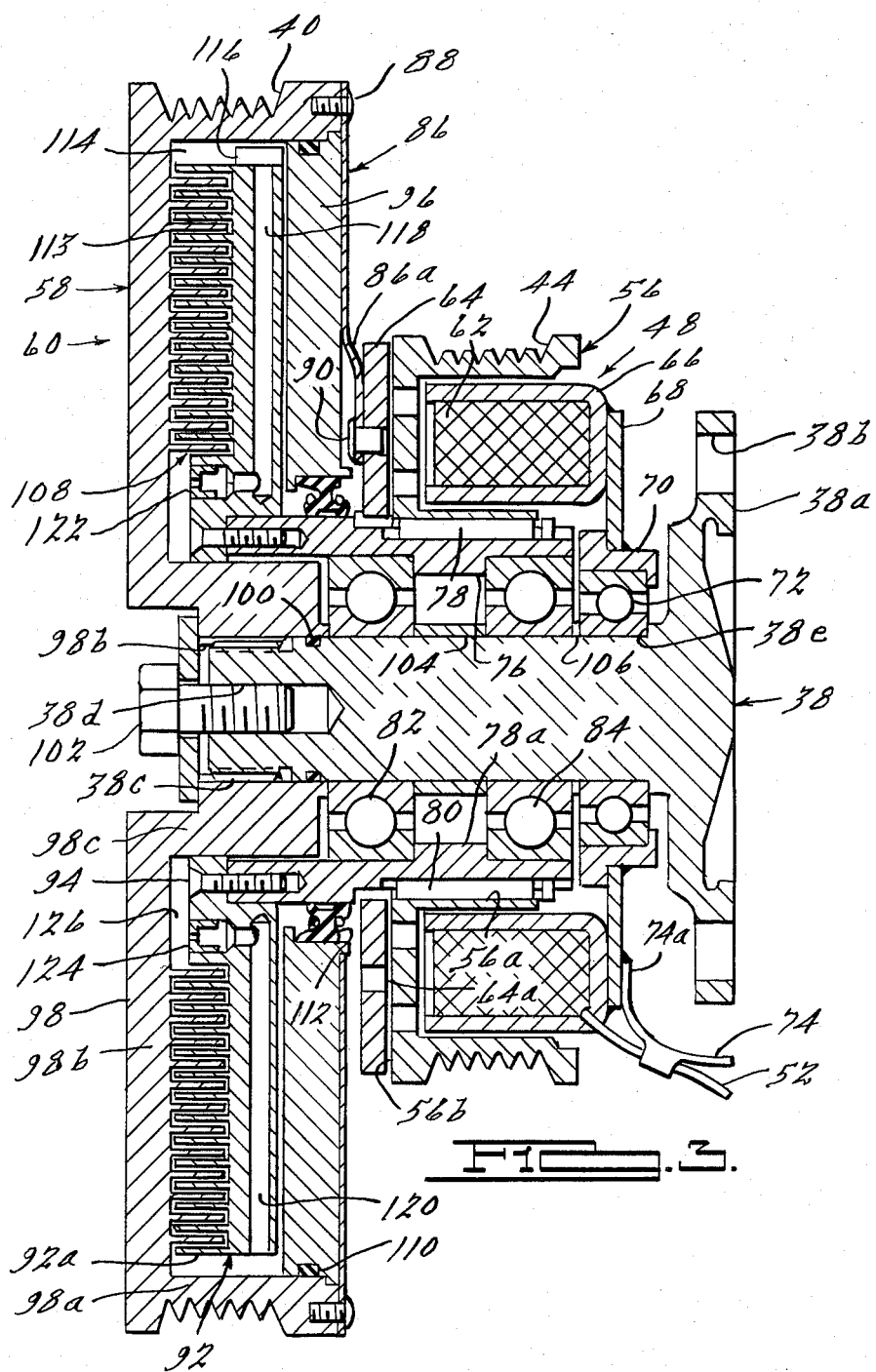
FIG. 3 is an enlarged sectional view of the drive mechanism looking along line 3—3 of FIG. 2.

The motor vehicle driveline seen schematically in FIG. 1 includes an internal combustion engine 10 and a transmission 12 having an input shaft 14 driven by the engine and an output shaft 16 driving rear and/or front wheels 18 of the vehicle through a differential 20. Engine 10 includes a plurality of accessories seen more completely in FIG. 2. The accessories include an air-conditioner compressor 22, a power steering pump 24, an accessory drive mechanism 26 of the present invention, an unshown water pump and cooling fan 28 sharing a common axis of rotation, an alternater 30, two idler pulleys 34, and an air pump 36. The accessory drive mechanism includes an input driveshaft 38 directly driven by an unshown engine crankshaft, a pulley 40 for driving the air pump via a belt 42, and a pulley 44 for driving the remainder of the accessories via a serpentine belt 46.

Mechanism 26 includes an electromagnetic clutch assembly 48, which is shown only in FIG. 3 and which is engaged and disengaged via an acceleration sensor 50 connected to the clutch assembly by an electrical conductor 52. Sensor 50 provides an electrical signal for engaging the clutch assembly during steady-state operation of shaft 14. Acceleration of the shaft above a predetermined amount removes the signal and disengages the clutch assembly. Acceleration is merely one example of an operating condition which may be sensed to engage and disengage the clutch assembly, e.g., clutch assembly 48 may be disengaged in response to an increased power demand which may be sensed by a sensor responsive to throttle pedal movement or increased fuel flow to the engine.

Looking now at the sectional view of mechanism 26 in FIG. 3, the mechanism includes the input driveshaft 38, the electromagnetic clutch assembly 48, a first output drive defined by the pulley 44 which forms an integral part of an annular pole member 56 of clutch assembly 48, and a second output drive defined by the pulley 40 which forms an integral part of a housing member 58 of a viscous coupling 60. The right end of shaft 38 includes a flange portion 38a adapted for attachment directly to an unshown end of the engine crankshaft via unshown bolts which extend through bores 38b in the flange. The left end of shaft 38 includes a plurality of splines 38c and a threaded bore 38d.

The electromagnetic clutch assembly includes an annular coil 62, the annular pole member 56 of U-shaped cross section, and an annular ring or armature member 64. Coil 62 is contained in an annular trough defined by a metal cover 66. The cover and coil are concentrically supported on shaft 38 via a radially extending flange 68 welded at its outer periphery to the cover and at its inner periphery to a sleeve 70 pressed on the outer race of a ball bearing 72 supported on shaft 38. Coil 62 is energized by wire 52 and rotation of the coil is prevented by a partially shown tether 74 fixed at its shown end 74a to flange 68 and at its unshown end to the engine housing in a conventional manner. The inner periphery 56a of pole member 56 is secured to the outer periphery of a sleeve 76 by keys 78, 80. The sleeve is mounted on shaft 38 by ball bearings 82, 84. Accordingly, pole member 56 and sleeve 76 are free to rotate relative to shaft 38 and coil 62. Armature 64 is concentrically supported for rotation about the axis of shaft 38 by a spring assembly 86 fixed to housing 58 of the viscous coupling. The spring assembly, which is best seen in FIG. 4, is formed from an annular spring steel disk fixed at its outer periphery to the viscous coupling housing by a plurality of fasteners 88 and to armature 64 via fasteners 90 at the ends of three leaf springs 86a. The leaf springs are chordally disposed with respect to the outer circumference of the disk. Accordingly, armature 64 is fixed for rotation with housing 58, is free to rotate relative pole member 56, and is free to move axially. Mutually facing surface portions 56b and 64a of the pole and armature are axially spaced apart by the leaf springs when coil 62 is unenergized and frictionly engaged to lock housing 58 to the pole member when the coil is energized.

Viscous coupling 60 includes the housing 58 and an annular clutch member 92 fixed to sleeve 76 by a plurality of fasteners 94. Housing 58 includes a radially extending end wall 96 and an annular axially opening trough member 98. Member 98 includes an axially extending outer portion 98a defining pulley 40 on its outer circumferential surface, a radially extending end wall portion 98b, and an axially extending inner hub portion 98c having splines 98d mating with splines 38c. The interface between shaft 38 and hub 98c is sealed by an O-ring 100 disposed in an annular groove in shaft 38. The splines form a permanent attachment connecting shaft 38 to housing 58 and, therefore, a permanent attachment connecting shaft 38 with clutch armature 64 or surface portion 64a, whereby engagement of the clutch assembly prevents relative rotation between input driveshaft 38, housing 58, and the output drive defined by pulley 44. A bolt 102, threaded into bore 38d, retains the housing on shaft 38. Axial positioning of the several parts forming the coupling and clutch is provided by a shoulder 38e, sleeves 104 and 106 between the bearing inner races, and a sleeve portion 78a between the outer races of bearing 82, 84. End wall 96, which closes the open end of housing member 58 to define an annular closed compartment 108, is held in position by spring assembly 86 and mating steps in the inner and outer circumferential surfaces of portion 98a and end wall 96, respectively. Compartment 108 is partially filled with a viscous fluid which may be a silicone liquid such as dimethyl polysiloxane. The liquid is prevented from escaping radially outward of the compartment by an O-ring seal 110. Leakage at the radially inner portion of the compartment is prevented by a double lip elastomer seal 112 pressed into the inner circumferential surface of end wall 96, by O-ring seal 100, and by seals in the ball bearings.

The confronting, axially facing surfaces of wall portion 98b and clutch member 92 define interdigitated, axially extending, annular rings defining a working chamber 113 of increased surface area for viscous clutching coacting between the housing and clutch member when viscous liquid is in the chamber and when relative rotation exists between housing 58 and clutch member 92.

The space between the inner circumferential surface of portion 98a and the outer circumferential surface 92a of clutch member 92 defines an annular reservoir 114 capable of holding a substantial portion of the total amount of viscous liquid in compartment 108 when housing 58 is rotating. Viscous liquid in the reservoir is returned to the working chamber via identical pumps 116, fixed 180° apart, to the outer circumferential surface of clutch member 92 and closely spaced from the inner surfaces of portion 98a and end wall 96. Only the pump at the top of clutch member 92 is shown. Pumps 116 are circumferentially positioned directly behind passages 118, 120 which extend radially inward beyond working chamber 113 and then axially through flow restrictors or regulators 122, 124 into a chamber 126. Pumps 116, which are of the well-known dam or impact type used in many viscous couplings, are active only when relative rotation exists between the housing and clutch member. More specifically, when housing 58 rotates clockwise faster than clutch member 92, viscous liquid, which is dragged along, impacts the faces of the pumps adjacent passages 118, 120 and creates a pressure effective to flow the liquid radially inward in passages 118, 120.

Operation of drive mechanism 26 is in accordance with the graph of FIG. 5, therein is shown the angular speed of input driveshaft 38 relative to output drive pulley 44. The angular speed of pulley 40 relative to input shaft 38 is, of course, constant since housing member 58 is fixed to shaft 38. During steady-state modes of engine or vehicle operation, electromagnetic clutch 48 is engaged by an electrical signal received from acceleration sensor 50. Hence, the angular input speeds (IS) and output speeds (OS) of input and output drives 38, 44 are the same and overlie each other as shown by the horizontal lines prior to time $t_1$, and after time $t_3$. In between $t_1$ and $t_3$, the path of input speed (IS) increases as would normally be the case, and the path of output speed (OS) drops quickly to a minimum speed and then increases. The output speed path is provided by the viscous coupling in response to disengagement and reengagement of the electromagnetic clutch 48 at $t_1$ and $t_3$ respectively.

While clutch 48 is engaged, relative rotation between housing 58 and clutch member 92 of the viscous coupling is prevented since armature and pole portions 64a and 56b are engaged. Hence, pump 116 is inactive and reservoir fills due to centrifugal forces acting on the viscous fluid. When the reservoir is full, enough viscous liquid remains in working chamber 113 to provide the coupling with a torque transmitting capacity capable of driving output drive pulley 44 at a speed or maximum value effective to maintain power steering. Hence, when clutch 48 is disengaged at time $t_1$ and drive is via viscous shear in working chamber 113, the output speed (OS) quickly drops to the minimum value since only a small or reduced amount of viscous liquid is in the working chamber at this time. The relative rotation between housing 58 and clutch member 92 activates pump 116 but output speed (OS) remains at the minimum value until pumped liquid reaches the working chamber at time $t_2$. Thereafter, the amount of liquid in the working chamber increases with a resultant increase in the output speed, i.e., relative rotation of the input and output drives decreases. When the relative rotation reaches some minimum value, the electromagnetic clutch may be reengaged with minimum shock.

The time between $t_1$ and $t_3$ may be preset or controlled in many ways. The time may be preset based on average acceleration time periods of vehicles during urban driving and may be abbreviated or shortened in response to engine temperature exceeding some predetermined value.

The drive mechanism embodiment and control embodiment for the drive mechanism have been disclosed for illustrative purposes. Many variations of the disclosed embodiments are believed to be within the spirit of the inventions therein. For example, a hydrodynamic coupling may be used in lieu of viscous coupling 26. The following claims are intended to cover the inventive portions of the disclosed embodiments and modifications believed to be within the spirit of the inventions therein.

What is claimed is:

1. In a drive mechanism of the type including input and output drives mounted for relative rotation about a common axis; a clutch assembly including first and second portions mounted for relative rotation about the axis and operative when engaged to prevent relative rotation of the drives; and a fluid coupling including a rotatable housing member defining an annular compartment concentric to the axis and containing a fluid, and an annular clutch member disposed in the compartment for rotation about the axis relative to the housing; the members including annular conforming portions defining a working chamber for transmitting torque between the members in response to relative rotation of the members and in proportion to the amount of fluid in the working chamber; the improvement comprising:
a first attachment connecting the housing to the input drive to prevent relative rotation therebetween;
a second attachment connecting the housing to the first portion of the clutch assembly to prevent relative rotation between the housing and output drive in response to engagement of the clutch assembly;
means reducing the amount of fluid in the working chamber when the clutch assembly is engaged; and
means increasing the amount of fluid in the working chamber when the clutch assembly is disengaged, whereby disengagement of the clutch assembly effects a rapidly reduced rotational speed of the output drive relative to the input drive followed by an increase in the rotational speed of the output drive relative to the input drive for minimizing the relative rotational speeds prior to reengagement of the clutch assembly.

2. The drive mechanism of claim 1, wherein said means reducing includes an annular reservoir disposed radially outward of the working chamber for receiving fluid from the working chamber in response to centrifugal forces acting on the fluid.

3. The drive mechanism of claim 2, wherein said means increasing includes a pump communicating at its inlet with the reservoir and at its outlet with the working chamber.

4. The drive mechanism of claim 1, wherein said clutch assembly includes an electromagnetic clutch, said first portion is defined by an armature, and said second attachment includes means preventing relative rotation between the housing and armature and allowing limited axial movement of the armature along the axis.

5. The drive mechanism of claim 1, wherein said fluid is a viscous fluid and said torque is transmitted by shear forces.

6. The drive mechanism of claim 5, wherein said means reducing includes an annular reservoir disposed radially outward of the working chamber for receiving fluid from the working chamber in response to centrifugal forces acting on the fluid.

7. The drive mechanism of claim 6, wherein said means increasing includes a pump communicating at its inlet with the reservoir and at its outlet with the working chamber.

8. The drive mechanism of claim 7, wherein said clutch assembly includes an electromagnetic clutch, said first portion is defined by an armature, and said second attachment includes means preventing relative rotation between the housing and armature and allowing limited axial movement of the armature along the axis.

9. The drive mechanism of claim 1, wherein said input drive is driven by an engine crankshaft, said output drive is a pulley driving a plurality of engine accessories via a serpentine belt, and said mechanism further includes a second output drive rotatably fixed to said housing and driving at least one other engine accessory at rotational speeds constant relative to said input drive.

10. In an engine powered vehicle, a mechanism for driving engine driven accessories at rotational speeds constant relative to engine speeds during steady-state operation of the vehicle and at reduced speeds in response to an increased power demand of the engine, the mechanism comprising:

an input shaft driven about an axis at rotational speeds constant relative to the engine and an output drive concentric to the axis and rotatable relative to the input shaft;

a viscous coupling including a housing member fixed for rotation with the input drive about said axis and defining an annular compartment, a clutch member disposed in the compartment and mounted on the input shaft for rotation about said axis relative to said input shaft, a viscous fluid disposed. in said compartment for effecting a viscous clutching coaction between said members;

an electromagnetic clutch including a coil portion concentric to the axis and fixed against rotation, a pole portion fixed for rotation with said output drive, and an armature portion fixed for rotation with said housing member and axially moveable into engagement with said pole portion in response to an electrical signal energizing the coil;

means for reducing the amount of fluid in a working chamber portion of said compartment in response to said coil being energized; and means for increasing the amount of fluid in the working chamber portion in response to said coil being deenergized.

* * * * *